Nov. 16, 1965 R. W. MIFFLIN 3,218,578

CARRIER SUPPRESSED AMPLITUDE MODULATION SYSTEM UTILIZING FREQUENCY MODULATION AND A $J_0$-ORDER BAND-PASS FILTER

Filed Jan. 15, 1963

INVENTOR.
RALPH W. MIFFLIN
BY Wade Koontz
ATTORNEY 3,218,578
Patented Nov. 16, 1965

3,218,578

CARRIER SUPPRESSED AMPLITUDE MODULATION SYSTEM UTILIZING FREQUENCY MODULATION AND A $J_0$-ORDER BAND-PASS FILTER

Ralph W. Mifflin, Rome, N.Y., assignor to the United States of America as represented by the Secretary of the Air Force Filed Jan. 15, 1963, Ser. No. 252,018
1 Claim. (Cl. 332—41)
(Granted under Title 35, U.S. Code (1952), sec. 266)

The invention described herein may be manufactured and used by or for the United States Government for governmental purposes without payment to me of any royalty thereon.

This invention relates to an improved method of producing an amplitude modulated wave.

An object of the invention is to achieve greater efficiency in producing an amplitude modulated wave.

For a typical frequency modulated wave, *e*, one expression of the carrier and sideband signals in terms of Bessel functions in in the form:

$$\frac{e}{E}=\sin(\omega_c t+m_f \sin \omega_m t)=J_0(m_f)\sin \omega_c t$$
$$+J_1(m_f)[\sin(\omega_c+\omega_m)t-\sin(\omega_c-\omega_m)t]$$
$$+J_2(m_f)[\sin(\omega_c+2\omega_m)t+\sin(\omega_c-2\omega_m)t]+\cdots \quad (1)$$

In the equation, $E_1$ is the unmodulated carrier voltage, $\omega_c$ the carrier frequency, $\omega_m$ the frequency of the modulating signal, and $m_f$ the modulation index. The symbols $J_a(m_f)$ stand for Bessel functions of the first kind of order $a$, with argument $m_f$. The modulation index is the ratio of the frequency deviation $\Delta f$ of carrier frequency to the modulating frequency $q$. Thus, $$m_f=\frac{\Delta f}{q}$$

The equation shows that a frequency modulated wave has a spectrum containing a number of side frequencies spaced $\omega_m$ apart.

According to the principle employed in this invention, a carrier is modulated by an audio modulating signal to produce an amplitude modulated wave. The wave obtained from the amplitude modulation then is used as the modulating signal to frequency modulate a second carrier whose frequency is much higher than that of the first carrier. The frequency modulated wave so obtained may be pictured as a signal at the second carrier frequency plus a number of sideband signals, the carrier and each of the sidebands having an instantaneous amplitude determined by the amplitude modulated wave. Since the amplitudes of the sideband signals are determined by the modulation index $m_f$, each of the J-order terms is a complete AM signal with carrier and AM sidebands and no residual FM component. It is the invention method to apply the frequency modulated wave to a bandpass filter tuned to pass only a predetermined one of the J-order terms.

Figure 1:
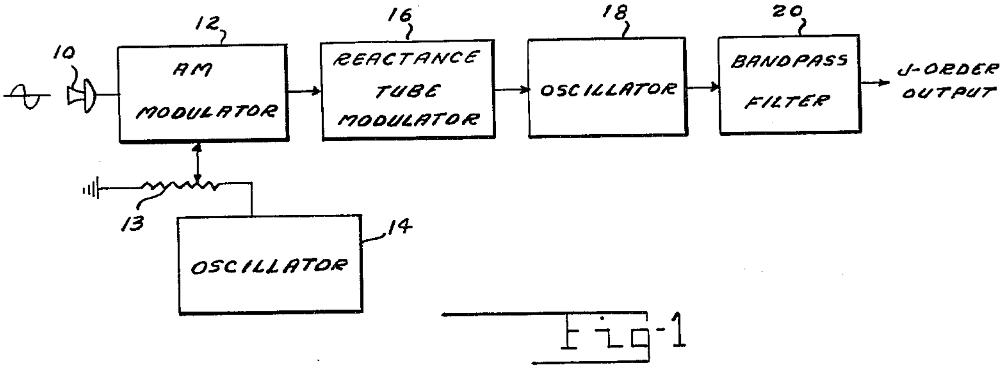
Figure 2:
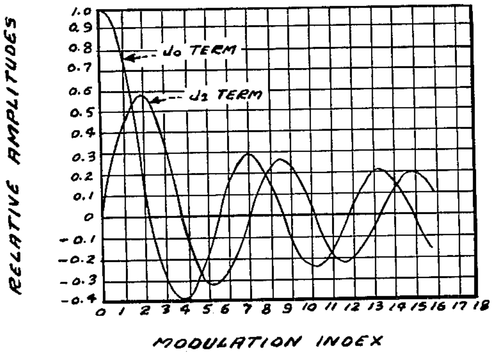

Complete understanding of the invention and any introduction to other features not mentioned may be had from the following detailed description of a specific embodiment thereof when read in combination with the drawings wherein:

FIG. 1 illustrates a block diagram of the modulation system arranged in accordance with the invention; and FIG. 2 graphically illustrates amplitude curves fundamental to frequency modulation.

Referring to FIG. 1, the modulation which may represent voice signals, musical passages, etc., is applied to a microphone 10. Receiving the input signals through one input terminal is an amplitude modulator 12 fed at a second terminal by a sub-carrier signal of predetermined frequency from an oscillator 14. The sub-carrier amplitude is adjustable through variation of an amplitude control, herein shown as a variable resistor 13. The modulator 12 is assumed to contain any suitable mixing tube of satisfactory characteristics for heterodyning the sub-carrier signal from oscillator 14 with the audio input signals to produce an amplitude modulated wave consisting of a carrier wave from oscillator 14 plus two sideband waves. The amplitude modulated wave from unit 12 is used as the modulating signal for a frequency modulating circuit. One acceptable modulating circuit is shown here in the form of a reactance tube modulator 16 combined with a second oscillator 18 capable of generating a carrier frequency signal considerably higher than the frequency of the sub-carrier of oscillator 14.

The reactance tube modulator is of the type well known in the art. Any detailed description thereof is believed unnecessary. It suffices for the present description to state that the effective capacitance of modulator 16 changes according to variations in the amplitude in the modulating signal from modulator 12 and this, in turn, changes the frequency of the carrier signal from oscillator 18. The frequency of oscillator 18 will vary linearly with the voltage of the amplitude modulated wave applied to reactance-tube modulator 16 from modulator 12 therein giving the desired frequency modulated wave. As shown by Equation 1, the frequency modulated wave can also be represented and analyzed as a carrier plus a series of sideband signals. The spacing of the sideband signals from the carrier frequency occurs at distances which are multiples of the frequency of oscillator 14.

As explained previously, Bessel functions are special functions which determine the sideband amplitudes in frequency modulated signals. By plotting the Bessel function values on a vertical scale in terms of the unmodulated value of the FM carrier and using the $m_f$ as the argument plotted along the horizontal scale, the coefficient of the J-order terms are conveniently arranged in tabular and graphical form. FIG. 2 shows the relative amplitudes of the $J_9$ and $J_1$-order terms of a typical FM modulated signal. An expression of Bessel function coefficient of an FM wave is shown in Equation 1. An analysis of the first order or $J_1$ term $$(J_1(m_f[\sin(\omega_c+\omega_m)t-\sin(\omega_c-\omega_m)t] \quad (2)$$

commonly called the first pair of sidebands, reveals that one of the sidebands is higher in frequency than the carrier by an amount equal to the modulating sub-carrier frequency, and the other is lower than the carrier frequency by the same amount. For example, if the sub-carrier signal of oscillator 14 were 20 kc., and the frequency of oscillator 18 were 2 mc., the frequency of one of the $J_1(m_f)$ terms of Equation 2 would be 2 mc. plus 20 kc. and the other $J_1(m_f)$ term would be 20 kc. below the 2 mc. carrier frequency. Similar observation of Equation 1 shows that the separation of other J-order terms likewise is a function of $\omega_m$.

The instantaneous deviation from the carrier frequency of oscillator 18 is determined by the amplitude of the amplitude modulation signal output of modulator 12. The sideband amplitudes and frequencies of the FM wave are determined by the frequency deviation and the modulating frequency signal, respectively. It will therefore be appreciated that, as the amplitude of the amplitude modulated wave from modulator 12 varies, the $J_1$-order term will vary in the same manner. This action of performing frequency modulation by using a wave already modulated in amplitude as the modulating signal effectively transfers or imposes an amplitude modulation onto each of the J-order sidebands, each thus being in itself an amplitude modulated signal.

The frequency modulated wave from oscillator 18 is fed to a bandpass filter 20 of any suitable type capable of performing frequency discrimination at the frequencies contemplated. Although in general the FM sideband amplitudes are generally non-linear functions of the modulation index, it will be seen from FIG. 2 that the $J_1$ terms vary quite linearly in the range $0<m_f<1$. Let it therefore be assumed that filter 20 is designed to pass one of the sideband signals of the $J_1$-order term. It is necessary first to establish an operating point on the linear region of the $J_1$ curve which represents the conditions when the signal input is zero, i.e., when the sub-carrier of oscillator 14 is unmodulated. Accordingly, by means of resistor 13, the peak amplitude of the unmodulated sub-carrier of oscillator 14 is adjusted until the $m_f$ of the FM signal of oscillator 18 is roughly in the center of the linear range. An optimum central value is $m_f=0.5$ where $\Delta f$ is roughly one-half the sub-carrier frequency. Adopting a mean setting of the quiescent $m_f$ enables optimum excursion of the positive and negative peak modulations without distortion of the amplitude modulated wave, when input signals are applied. To avoid distortion in the reproduction of the original modulating signal, the maximum amplitude of the amplitude modulated wave should be regulated so as not to introduce non-linearity to the $J_1$-order term. This would normally be an amplitude corresponding to a modulation index $m_f$ of about 1.0 for the $J_1$-order term.

The response characteristic of filter 20 depends on the frequency of the J-order sideband signal intended to be passed. For example, as assumed previously, let the carrier frequency of oscillator 14 be 20 kc. and the frequency of oscillator 18 be 2 mc. Assume that the range of the modulating signal is 0–4 kc. Because the amplitude modulated signal supplied by modulator 12 occupies a spectrum 8 kc. in width, it will be appreciated that the variations over the spectrum are transferred to the $J_1$-order term in a band 8 kc. wide. Assuming now that it is desired to have filter 20 pass only the upper $J_1$ sideband signal, it will be obvious that the center frequency of filter 20 is established at 2020 kc. The pass band of filter 20 accordingly is 2016–2024 kc. The pass band of filter 20, if the lower $J_1$ sideband signal is extracted for demodulating, requires no further discussion.

To realize the advantage of the modulation system described hereinabove, the J-order term chosen to pass through the bandpass filter may first be amplified along with the other J-order terms in highly efficient class-C amplifiers. The filter to pass the desired J-order term may thereafter be accomplished in the final section of the amplifier stages. Thus, a principal improvement in the invention over prior art systems is to produce an amplitude modulated wave in the manner illustrated so that highly efficient class-C amplification noted in frequency modulated systems is combined with low level modulation in the amplitude modulation stages thereby gaining the benefits of the two systems to achieve extremely efficient modulation. A further feature of the modulation system is that the frequency separation between adjacent sidebands of FM waves may be easily controlled by regulating the frequency of the sub-carrier feeding the modulator unit 12. Thus, through proper selection of the sub-carrier frequency of oscillator 14, harmonic distortion signals, cross modulation products, and Bessel function terms of other orders can reliably be excluded from the pass band of filter 20.

On the other hand, it is possible in the invention illustrated to take advantage of the linear characteristics which certain regions of the other J-order terms exhibit. This simply requires readjustment of the amplitude of the unmodulated sub-carrier signal of oscillator 14. Referring to FIG. 2, it may be seen that the amplitude of the $J_0$-order term, which is representative of the carrier of oscillator 18, varies linearly in the region of the first zero crossing, i.e., where $m_f$ roughly equals 2.4. By setting the modulation index roughly to 2.4 simultaneously with no modulation of the sub-carrier signal of oscillator 14 the output of oscillator 18 will not contain any carrier signal. When the sub-carrier signal is modulated, the modulation index varies directly with the modulation envelope and the carrier signal of oscillator 18 will remain suppressed due to shifting phase of the $J_0$-order term above and below the zero crossing as the modulation index varies. Any necessary change in the unmodulated amplitude of the sub-carrier signal is produced by adjusting the wiper of resistor 13. Double sideband carrier-suppressed signals will result by band passing the $J_0$-order term through filter 20.

Although one embodiment of the invention has been illustrated and described, it will be apparent to those skilled in the art that various changes and modifications may be made without departing from the spirit of the invention or the scope of the appended claim.

I claim:

A system for producing an amplitude modulated wave comprising: a subcarrier source of oscillations, a carrier source of oscillations, a modulator for amplitude modulating said subcarrier oscillations by information signals, variable resistance means for controlling the amplitude of said subcarrier oscillations, reactance tube means controlled by said modulator for frequency modulating said carrier oscillations, said variable resistance means being adjusted in the absence of said information signals so as to establish a modulation index of substantially 2.4, and a bandpass filter receiving the frequency modulated output of said carrier source with said information signals applied and having a passband which passes only the $J_0$ term of said frequency modulated signal whereby during fluctuations of said modulation index about said 2.4 value said carrier source oscillations are suppressed.

References Cited by the Examiner

UNITED STATES PATENTS 2,492,218 12/1949 Guanella ------------ 332—41
2,604,533 7/1952 Koros --------------- 332—1

HERMAN KARL SAALBACH, *Primary Examiner.*

ALFRED L. BRODY, ROY LAKE, ELI LIEBERMAN, *Examiners.*

UNITED STATES PATENT OFFICE
CERTIFICATE OF CORRECTION

Patent No. 3,218,578 November 16, 1965

Ralph W. Mifflin

It is hereby certified that error appears in the above numbered patent requiring correction and that the said Letters Patent should read as corrected below.

Column 2, line 43, for "$J_9$" read -- $J_0$ --.

Signed and sealed this 25th day of October 1966.

(SEAL)
Attest:

ERNEST W. SWIDER
Attesting Officer

EDWARD J. BRENNER
Commissioner of Patents